Patented Oct. 18, 1949

2,485,294

UNITED STATES PATENT OFFICE 2,485,294

COPOLYMERS OF TETRAHYDROABIETYL ALCOHOL-MODIFIED UNSATURATED ALKYD RESINS AND VINYL COMPOUNDS

Edward L. Kropa, Old Greenwich, Conn., assignor to American Cyanamid Company, New York, N. Y., a corporation of Maine No Drawing. Application March 12, 1946, Serial No. 653,959

7 Claims. (Cl. 260—26)

This invention relates to polymerizable compositions, to the polymerization of such compositions to form insoluble resins, and to the production of coating compositions, molding compositions, molded articles, laminated articles, etc., from the polymerizable compositions. Polymerizable compositions of this invention include a reactive alkyd resin and an organic substance, generally a reactive solvent. Upon reaction of these substances, a substantially insoluble resin is formed.

One of the objects of this invention is to prepare improved resins and especially to obtain clear and colorless gels.

It is also an object of this invention to provide potentially polymerizable solutions which would be stable during storage.

Still another object of this invention is to control the rate of polymerization of the reactive mixture, as well as to improve the properties and characteristics of resulting gels.

Another object of this invention is to prepare compounds particularly suitable for use as coating compositions and as components in coating compositions.

A further object of the present invention is to prepare molding compositions and especially to prepare clear and colorless molded materials. Another object of this invention is to prepare laminated moldings having high strength and other desirable properties.

A still further object of this invention is to provide molding compositions suitable for injection molding. Other objects will be apparent from the description.

According to the present invention I have found that substantially insoluble, substantially infusible resins may be prepared by means of the chemical reaction or polymerization of a mixture containing a resin possessing a plurality of polymerizably reactive alpha, beta enal groups, i. e.

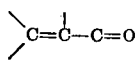

and an organic substance which contains the polymerizably reactive group $CH_2=C<$, which has a boiling point of at least 60° C., and which has no conjugated carbon-to-carbon double bonds. Such mixtures may be utilized in coating compositions, in molding compositions, in laminating, in adhesives, in casting compositions, etc.

For the sake of brevity, the organic substances which contain the polymerizably reactive group, $CH_2=C<$ will be referred to herein as "reactive materials" or as "reactive materials containing the $CH_2=C<$ group," and they are thus to be distinguished from the resins which possess a plurality of polymerizably reactive alpha, beta enal groups which are designated herein as "reactive resins" or as "unsaturated alkyd resins."

Many of the reactive materials containing the $CH_2=C<$ group are solvents, and therefore the reactive resins may be dissolved therein to form liquid compositions which may be used as such without the addition of any other solvent unless particularly desirable. It is to be understood, however, that I am not restricted to liquid substances which actually act as solvents, since in some cases the organic liquid substances may in fact act as a solute rather than as a solvent, it being dissolved by the resin, or a colloidal solution may be produced instead of a true solution. Furthermore, the reactive material may be a resin containing a plurality of $CH_2=C<$ groups or $CH_2=CHCH_2—$ groups. Such a substance could be cured by a reactive resin or by a reactive substance which contains polymerizably reactive alpha, beta enal groups. Such substances may be derived from alpha, beta unsaturated organic acids, for example, by esterification of such acids.

Among the reactive resins used in the practice of this invention for interaction with the reactive material containing the $CH_2=C<$ groups are those which are derived from alpha, beta unsaturated organic acids and, therefore, contain the reactive groupings present in these acids. The term "acids" as used herein is intended to include the anhydrides as well as the acids themselves since the former may be used instead of the acid. The term "alpha, beta unsaturated organic acid" as used in the art does not include acids wherein the unsaturated group is part of an aromatic-acting radical, as for example, phthalic acid, and the same definition is adopted herein.

Resins used in the practice of the present invention are preferably produced by the esterification of an alpha, beta unsaturated polycarboxylic acid with a polyhydric alcohol, particularly a glycol, in the presence of tetrahydroabietyl alcohol. Although esterification of the acid with a polyhydric alcohol is perhaps one of the simplest, most convenient ways of obtaining a reactive resin, I am not precluded from using resins otherwise derived from alpha, beta unsaturated organic acids. Reactive resins suitable for my invention are any of those containing a plurality of polymerizably reactive alpha, beta enal groups.

A reactive resin such as those prepared by esterification of alpha, beta unsaturated organic acids and a glycol or other polyhydric alcohol in the presence of tetrahydroabietyl alcohol is mixed with th reactive material containing the groups, CH$_2$=C<. Upon adding a polymerization catalyst and subjecting the mixture to polymerization condition such as, for example, heat, light, or a combination of both, a substantially insoluble, substantially infusible resin is obtained.

All of the reactive substances suitable for use according to my invention for reaction with a reactive resin are characterized by the presence of the reactive group CH$_2$=C< and none of them contains conjugated aliphatic carbon-to-carbon double bonds. Compounds containing a conjugated system of aliphatic carbon-to-carbon double bonds are known to react with themselves or with other unsaturated compounds such as the maleic esters, by a 1,2 or 1,4 addition mechanism such as that which has become generally known as the Diels-Alder reaction. On the other hand, compounds such as those used according to the present invention which contain no conjugated aliphatic carbon-to-carbon double bonds obviously cannot undergo this type of reaction with the maleic esters. Accordingly, my invention is not directed to the use of unsaturated compounds containing conjugated systems of aliphatic carbon-to-carbon double bonds. Many substances which contain a carbon-to-carbon double bond conjugated with respect to oxygen are suitable for use according to my invention since they do not react with unsaturated alkyd resins in an undesirable manner but, instead, copolymerize or interpolymerize to form substantially infusible, substantially insoluble resins.

Among the reactive compounds containing the CH$_2$=C< group which may be used in the present invention are: styrene, o-, m-, p-methyl styrenes, p-methoxy styrene, p-ethoxy styrene, p-cyanostyrene, any of the nuclear monochlor styrenes, o-, m-, p-isopropenyl toluenes, the 2,3-, 3,4-, 2,4-, 2,5-, and 2,6-dimethyl styrenes, isopropenyl benzene, styrenes containing one or more nuclear substituted fluorine or bromine groups, vinyl naphthalene, vinyl mesitylene, o-, m-, p-vinyl diphenyls, vinyl carbazole, vinyl phenols, vinyl furane, dialkyl esters of maleic acid, fumaric acid and itaconic acid (including dimethyl fumarate, dimethyl maleate, diethyl maleate, dibutyl fumarate, dimethyl itaconate, dibutyl itaconate), etc.

Allyl compounds, i. e., those containing the CH$_2$=CH—CH$_2$— group may also be used. Of the allyl compounds which may be used, the allyl esters form a large class all of which are suitable. The reactive allyl compounds which have been found to be most suitable are those having a high boiling point such as the diallyl esters, e. g. diallyl maleate, diallyl fumarate, diallyl phthalate and diallyl succinate. Other allyl compounds may also be used which are not necessarily high boiling. As pointed out in my copending application, Serial No. 487,034, filed May 14, 1943, now abandoned, substantially insoluble and substantially infusible resins may be prepared by reacting or polymerizing any of the following with a polymerizably reactive resin of the type described above, i. e., unsaturated alkyd resins containing a plurality of alpha, beta enal groups: allyl alcohol, methallyl alcohol, allyl acetate, allyl lactate, the allyl ester of alpha-hydroxyisobutyric acid, allyl acrylate, allyl methacrylate, diallyl carbonate, diallyl malonate, diallyl oxalate, diallyl succinate, diallyl gluconate, diallyl methylgluconate, diallyl adipate, the diallyl ester of azelaic acid, diallyl sebacate, diallyl tartronate, diallyl tartrate, diallyl silicone, diallyl silicate, diallyl fumarate, diallyl maleate, diallyl mesaconate, diallyl citraconate, diallyl glutaconate, the diallyl ester of muconic acid, diallyl itaconate, diallyl phthalate, diallyl chlorophthalate, the diallyl ester of endomethylene tetrahydrophthalic anhydride, triallyl tricarballylate, triallyl aconitate, triallyl citrate, triallyl phosphate, trimethallyl phosphate, triallyl silicone, triallyl cyanurate, tetraallyl silicate and other tetraallyl esters. Other allyl esters including those disclosed in my copending application Serial No. 555,194 filed September 21, 1944, now U. S. Patent 2,443,741, may be substituted for any of the above-listed compounds.

The polymerization catalysts include the organic superoxides, aldehydic and acidic peroxides. Among the preferred catalysts there are: the acidic peroxides, e. g. benzoyl peroxide, phthalic peroxide, succinic peroxide and benzoyl acetic peroxide; fatty oil acid peroxides, e. g. coconut oil acid peroxides, lauric peroxide, stearic peroxide and oleic peroxide; alcohol peroxides, e. g. tertiary butyl hydroperoxide usually called tertiary butyl peroxide and terpene oxides, e. g. ascaridole. Still other polymerization catalysts might be used in some instances such as soluble cobalt salts (particularly the linoleate and naphthenate), p-toluene sulfonic acid, aluminum chloride, stannic chloride and boron trifluoride.

The term "polymerization catalyst" as used in this specification is not intended to cover oxygen contained in the resin as an impurity. While this small amount of oxygen would only catalyze the reaction to a very small extent, in order to eliminate any ambiguity the term "polymerization catalyst" is specifically defined as excluding any oxygen present as an impurity in the resin itself.

The concentration of catalyst employed is usually small, i. e., for the preferred catalysts from about 1 part catalyst per thousand parts of the reactive mixture to about 2 parts per hundred parts of the reactive mixture. If an inhibitor be present, up to 5% or even more of catalyst may be necessary according to the concentration of inhibitor. Where fillers are used which contain high concentrations of substances which act as inhibitors, e. g. wood flour, the concentration of catalyst necessary to effect polymerization may be well above 5%.

The polymerization conditions referred to are heat, light, or a combination of both. Ultraviolet light is more effective than ordinary light. The temperature of conversion depends somewhat on the boiling point of the reactive material and also on the pressures used. At atmospheric pressure, as in coating and casting operations, temperatures near or above the boiling point are unsuitable in most instances since substantial amounts of the reactive material would be lost by evaporation before the reaction between the resin and reactive material can be completed. Accordingly, a temperature between room temperature (about 20°–25° C.) and the boiling point is usually employed where polymerization of this nature is carried out. The rate of polymerization doubles for about each ten degrees (C.) rise in temperature for this reaction. A temperature is selected which will give a suitable reaction rate and yet not cause substantial volatilization. The following table shows the approximate polymerization temperatures most suitable for the named reactive materials:

| Reactive Material | Temperature Range | Preferred Temperature |
|---|---|---|
| | | ° C. |
| diallyl maleate | room temp. to about 110° C | 50 to 90 |
| diallyl phthalate | room temp. to about 150° C | 50 to 90 |

Obviously it will be necessary to use lower temperatures if large or very thick pieces are being cast because of the exothermic reaction and poor heat conductivity of the reacting mixture.

Where suitable precautions are taken to prevent evaporation of my reactive material or where pressure molding is used, higher temperatures than those mentioned above can be used. Since the time of curing is desirably much shorter (in pressure molding at elevated temperatures) and since the reactive material containing the

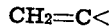

$CH_2=C<$ group would not be lost so easily, a higher temperature is preferred.

The particular reactive resin, reactive material and catalyst is selected according to the type of product desired, taking into account the solubilities of the reactants as well as the character of the resulting gels. Some combinations of reactive resins and reactive materials result in opaque gels while others give clear products in the gel state. Obviously for many purposes the opaque gel may be used equally as well as the clear gel.

The invention will be described in greater detail in conjunction with the following specific examples in which the proportions are given in parts by weight. It should be understood that the examples are merely illustrative, and it is not intended that the scope of the invention be limited to the details therein set forth.

Example 1

A resin obtained by the reaction of fumaric acid, diethylene glycol and tetrahydroabietyl alcohol (resin "A") is cut with diallyl phthalate to form a solution composed of 2 parts of resin to 1 part of diallyl phthalate. To 100 parts of said solution 0.005 part of benzoyl peroxide, 0.0008 part of cobalt naphthenate and 0.0004 part of manganese naphthenate are added. The resulting composition is applied to a rather coarse weave of glass cloth. The impregnated cloth is cut and stacked to form an assembly which is cured by heating in air for about 2 hours at 100° C. The surface is tack-free, and during the heating the resin pulls itself down between the fibers on the surface leaving a rough uniform exterior which could be used as an excellent base for oil painting since the rough surface readily pulls paint from a brush. Using a fabric of a linen weave, the surface of the laminate could be made smooth.

Example 2

A resin prepared by reaction of diethylene glycol, fumaric acid, tetrahydroabietyl alcohol and linseed oil fatty acids (resin "B") is cut with diallyl phthalate in a ratio of 3 parts of resin to 2 parts of diallyl phthalate thereby producing a solution having a viscosity of M—N (Gardener-Holt). A solution containing equal parts of the resin and diallyl phthalate has a viscosity of about G—H (Gardner-Holt). To 100 parts of either of these solutions the following is added:

| | Part |
|---|---|
| Cobalt naphthenate | 0.004 |
| Manganese naphthenate | 0.002 |
| Benzoyl peroxide | 0.15 |

Films of the resulting solution dry tack-free in about 1 hour at around 125° C. to yield hard coatings.

Example 3

Resin "A" is cut with styrene in a ratio of 2 parts resin to 1 part styrene. To 100 parts of this solution are added 0.01 part of hydroquinone and 0.067 part of an 8% cobalt naphthenate solution. Films of the resulting solution dry tack-free in about 1 hour at 125° C. to yield a hard coating.

Example 4

| | Parts |
|---|---|
| Fumaric acid | 638 |
| Ethylene glycol | 310 |
| Tetrahydroabietyl alcohol | 292 |

All of the materials are mixed together and heated under an atmosphere of carbon dioxide to to about 160° C. for 6 hours and 180° C. for 8 hours, to obtain a resin having an acid number of 49. The resin is clear and viscous while hot, but upon cooling and standing it hardens and slowly becomes opaque due to crystallization.

Example 5

| | Parts |
|---|---|
| Fumaric acid | 638 |
| 1,3-butylene glycol | 450 |
| Tetrahydroabietyl alcohol | 292 |

The materials are mixed together and heated at about 200° C. for 8 hours under an atmosphere of carbon dioxide. The clear very stiff resin has an acid number of 53.

Example 6

| | Parts |
|---|---|
| Fumaric acid | 538 |
| Hexaethylene glycol | 1410 |
| Tetrahydroabietyl alcohol | 292 |

The materials are mixed together and heated at 180° C. for about 3 hours under an atmosphere of carbon dioxide. The clear dark colored resin is of a heavy syrupy consistency and has an acid number of 48.

The resins of Examples 4, 5 and 6 may be cut with diallyl phthalate or styrene as in Examples 1, 2 and 3.

In place of part or all of the diallyl phthalate employed in Examples 1 and 2 or of the styrene employed in Example 3, I may substitute any of the other reactive compounds containing the $CH_2=C<$ group previously mentioned herein. Moreover I may substitute equivalent molar proportions of these reactive compounds or I may vary the proportions thereof. Any desired proportion of reactive compound to unsaturated alkyd resin may be used, but I prefer to use from 5%–95% of one ingredient with corresponding amounts of 95%–5% of the other. If the copolymer product is intended for use in laminating or molding, then I prefer a weight ratio of ingredients of from 4:1 to 1:4.

Part of the tetrahydroabietyl alcohol modified unsaturated alkyd resin may be replaced by an unmodified unsaturated alkyd resin or by unsaturated alkyd resins modified with other alcohols or acids.

Viscosity adjustment of reactive mixture

It is sometimes desirable to reduce the viscosity of my mixtures of reactive resin and reactive material containing the $CH_2=C<$ group, as for instance, when a very viscous resin is to be used for coating. It is possible to do this by adding an esterification catalyst, e. g. p-toluene sulfonic acid, and then heating until the viscosity goes down. The mechanism of this change is probably re-esterification. This is also useful when the composition is to be baked at high temperature, under which conditions the reactive material would be lost in part by evaporation. If this "thinning" process is carried out, the reactive material is combined with the resin by re-esterification and is not lost. It is also desirable to add a polymerization inhibitor before the heating or "thinning" process.

In casting or molding operations using a mixture of a reactive resin and reactive material containing the $CH_2=C<$ group, it may sometimes be desirable to body the reactive mixture before adding the catalyst in order to cut down the induction period which would otherwise be too long. This may be done by heating a mixture of resin and reactive material from about 70° C. to about 110° C., preferably at about 90° C., for a sufficient length of time to substantially reduce the induction period. This time will vary with each resin-reactive material combination with the initial viscosity and other such factors but may be determined by observation of the rise of viscosity. The heating should continue until the viscosity begins to rise rapidly. A general rule for determining the heating time is to heat the mixture until the viscosity is about two to three times the initial viscosity.

After the bodying operation is carried out, the polymerization catalyst is added to the mixture and the whole subjected to polymerization conditions. The use of liquid peroxides instead of solid peroxides is an advantage after bodying the resin mixture since it is difficult to get the solid peroxides dissolved rapidly enough. Peroxides of the coconut oil acids, tertiary butyl peroxide and ascaridole are suitable liquids.

By the use of this process the induction period is cut down from approximately ½ to ⅛ the time that is required when the bodying process is not used. Even greater reductions are obtained with some mixtures.

In bodying reactive mixtures containing the reaction resin and a reactive material containing the $CH_2=C<$ group wherein the proportions of reactive material are greater than about 30%, the viscosity rise is so sudden that it may be somewhat difficult to control. Accordingly, if it is desired to body a resin-reactive material mixture containing more than 30% of reactive material, an alternative procedure is used. By this method one first bodies a mixture containing only 30% of reactive material. Then a small portion of additional reactive material is added, for example, sufficient to make the reactive material concentration 40%, and then this is bodied. If still more reactive material is desired, another small portion of reactive material is added and the bodying process repeated. This process is repeated until the desired concentration and viscosity is obtained.

Addition of inhibitors

One of the difficulties in the use of the compositions described above is that they are not susceptible to storage in the mixed form because polymerization will usually take place even at room temperature within a comparatively short time. Moreover, when it is desired to cure the compositions very rapidly under heat and pressure, the reaction becomes at times so vigorous that it cannot be controlled. In order to overcome these difficulties it has been found advisable to incorporate a small proportion of a polymerization inhibitor in the mixture of resin and reactive material. When it is desired to use this mixture, a small percentage of the polymerization catalyst is added sufficient to overcome the effect of the inhibitor as well as to promote the polymerization. By careful control of the concentrations of inhibitor and catalyst, a uniform product with a good reaction velocity is obtainable. Upon subjection of this mixture to polymerization conditions such as heat, light or a combination of both, with or without pressure, an infusible, insoluble resin is produced which has many more desirable characteristics than the resins produced by the polymerization of mixtures not containing the polymerization inhibitor such as, for instance, the lack of fracture.

Suitable polymerization inhibitors for this reaction are phenolic compounds, especially the polyhydric phenols, and aromatic amines. Specific examples of this group of inhibitors are hydroquinone, benzaldehyde, ascorbic acid, isoascorbic acid, resorcinol, tannin, sym. di-beta naphthyl-p-phenylene diamine, and phenolic resins. Sulfur compounds are also suitable.

The concentration of inhibitor is preferably low, and I have found that less than about 1% is usually sufficient. However, with the preferred inhibitors, I prefer to use only about 0.01% to about 0.1%.

The inhibitor may be incorporated in the reactive resin-reactive material combination (either before or after bodying), or it may be added to the original reactive resin before or during the esterification of the said reactive resin. By adding the inhibitor before the esterification it is sometimes possible to use an inhibitor which would otherwise be substantially insoluble in the reactive resin reactive material composition. By adding the inhibitor to the unesterified mixture the inhibitor may become bound into the resin upon subsequent esterification.

Reactive resins and their preparation

Reactive resins suitable for polymerization with reactive materials containing the $CH_2=C<$ group in accordance with the teachings of my invention are those which contain a plurality of alpha, beta enal groups. The simplest members of this group are those produced by the esterification of an alpha, beta-unsaturated organic acid with a polyhydric alcohol.

The preferred polyhydric alcohols are those which contain only primary hydroxyl groups since the presence of secondary hydroxyl groups may make it difficult to obtain rapid esterification. The glycols are generally preferable. If colorless resins be desired or if optimum electrical properties be desired, it is preferable to use glycols which do not have any oxygen bridges in their structure since the presence of oxygen linkages may lead to the formation of color bodies during the preparation of the resin. By the use of glycols which do not contain the oxygen bridges, clear colorless resins may be produced. On the other hand, oxygen bridges may be desirable if the resin is to be used in coating as they cause films to dry faster.

The particular choice of glycol or other polyhydric alcohol used in preparing the resin is governed mainly by the desired physical properties of the intermediate and final polymerization products, especially hardness, impact resistance, distensibility, refractive index, adhesion, compatibility relationships, etc., including also solvent, water, alkali, acid or chemical resistance in general.

The alpha, beta unsaturated organic acids which I prefer to use in preparing the reactive resins include maleic, fumaric, itaconic and citraconic, although other similar acids could be substituted such as mesaconic acid, aconitic acid and halogenated maleic acids, such as chlormaleic acid, and any of the foregoing could be substituted in part by acrylic, beta benzoyl acrylic, methacrylic, $\Delta^1$-cyclohexene carboxylic, cinnamic, and crotonic acids. Obviously, various mixtures of these acids can be used where expedient.

The reactive resins may be modified with other substances which are used in alkyd resins, i. e. monohydric alcohols, monobasic acids, or dibasic acids, e. g. phthalic acid, succinic acid, glutaric acid, adipic acid, azelaic acid, sebacic acid, etc., which do not contain groups polymerizably reactive with respect to organic substances containing $CH_2=C<$ groups. Those reactive resins of the present invention are modified with tetrahydroabietyl alcohol specifically. The modifying agents are usually used as diluents or plasticizers, chemically combined in the resin. The use of a small proportion of the saturated dibasic acids generally improves the mechanical properties of the resins after copolymerization with the material containing the $CH_2=C<$ group.

The reactive resins may be prepared from polyhydric alcohols other than the glycols or from mixtures including a glycol and a higher polyhydric alcohol. Examples of these are glycerol, pentaerythritol, etc. Polyhydric alcohols containing more than two hydroxyl groups react very readily with the alpha, beta unsaturated organic acids. Consequently, it may be preferable to use some monohydric alcohol in conjunction with the alcohols which contain more than two hydroxyl groups or else some monobasic acid may be used.

It is also possible to introduce initially into the resin structure a certain number of groupings of the type $CH_2=C<$ through the use of unsaturated alkyl compounds. One way of accomplishing this, for example, is by direct esterification of an unsaturated alcohol containing a $CH_2=C<$ group. Examples of such alcohols are allyl alcohol and methallyl alcohol.

While the reactive resins may be modified in the same general manner as other alkyd resins, it is preferable to have at least 20% polyhydric alcohol in the reactive mixture and at least 25% polybasic acid in said reactive mixture. If a monohydric alcohol or a dibasic acid which does not contain polymerizably active groups with respect to organic substances containing the $CH_2=C<$ groups be used, the proportion of such substance will depend on the properties required of the polymerized reactive material-reactive resin mixture. By the use of a relatively large proportion of a polymerizably active dibasic acid, e. g. maleic, in the reactive resin, a hard, tough polymer is produced upon subsequent reaction of said reactive resin with a reactive material containing the $CH_2=C<$ group. On the other hand, if the reactive resin is obtained from a relatively small proportion of polymerizably active dibasic acid and a relatively large proportion of acids which do not contain groups polymerizably active with respect to organic substances containing $CH_2=C<$ groups, a softer and more rubbery resin results upon polymerization with a reactive material containing the $CH_2=C<$ group. The same effect is produced by the introduction of other inactive ingredients. By varying the ingredients and the proportions of the ingredients, resins may be obtained having properties desirable for almost any particular use.

The unsaturated alkyd resins employed in accordance with my invention are preferably those having an acid number not greater than 50, although in some cases resins having an acid number as high as 100 may be desirable. Generally the acid number should be as low as possible, but this is sometimes controlled by practical considerations of operation such as time, temperature and economy.

The resins should be so formulated that the carboxyl groups of the acids are reacted with the theoretical molar equivalent of the hydroxyl groups of the alcohols. In this connection it is to be noted that the hydroxyl groups of modifying alcohols as well as the carboxyl groups of modifying acids should be included with the hydroxyl groups and carboxyl groups of the principal reactants, the polyhydric alcohol and the alpha, beta unsaturated polycarboxylic acid, respectively.

When glycols are reacted with dicarboxylic acids it is preferable that the glycol be present in a molar ratio to the acid of not less than 1:2 and that the molar ratio of monohydric alcohol to dicarboxylic acid be not greater than 1:1. In most cases it has been found that a molar ratio of monohydric alcohol to dicarboxylic acid of 1:6 produces the best results (5.5 mols of glycol being employed in this case). The same general rules apply when polyhydric alcohols other than glycols such as pentaerythritol, dipentaerythritol or polyallyl alcohols are used, or when other polycarboxylic acids having more than two carboxylic groups are used. In other words, the ratio of the monohydric alcohol to the polycarboxylic acid should preferably be not greater than 1:1 although higher ratios of monohydric alcohol may be employed if desired. However, for optimum results the ratio of monohydric alcohol to polycarboxylic acid should not exceed 1 mol of monohydric alcohol for each carboxyl group of the polycarboxylic acid in excess of 1. Thus, for example, a resin may be prepared by the reaction of 1 mol of dipentaerythritol with 5 mols of fumaric acid and 4 mols of monohydric alcohol.

If it be desirable to introduce lower alkyl groups into the resin, this may be done by using maleic esters of monohydric alcohols, e. g. ethyl maleate. The alkyl ester will then be united with the resin by polymerization. This could not be accomplished with the saturated type of alkyd, e. g., phthalic acid esters of polyhydric alcohols.

Resins which contain a plurality of alpha, beta enal groups are sensitive to light, heat and polymerizing catalysts. Since oxygen tends to cause these resins to polymerize, it is desirable that the resins should be made in the absence of this substance, especially when colorless resins are required. The exclusion of oxygen and polymerizing catalysts is desirable during the preparation of the resin and the presence of dissolved oxygen in the original reactants is also preferably avoided. Moreover, dust and extraneous particles that reagents may pick up usually should be removed, especially if colorless resins are desired. One manner in which the dissolved gases and other extraneous impurities may be removed is through the distillation of the ingredients into the reaction chamber in the absence of air.

In order to keep oxygen from contact with the reactants, an inert gas such as carbon dioxide or nitrogen may be introduced into the reaction chamber. This may be done either by merely passing the gas over the surface or by bubbling the gas through the liquid reactants. In the latter instance it may be made to perform the added function of agitating the mixture, thus eliminating the necessity for mechanical agitation. The inert gas will also carry away at least part of the water formed, and toward the end of the reaction it can be used to carry away the reactants still remaining unreacted. Upon separation of the water vapor the used carbon dioxide or other inert gas would be particularly suitable for making high grade colorless resins since any residual reactive impurities such as oxygen would have been removed in its passage through the first batch of resin reactants.

The effect of light is not so important if the reactants are purified and the reaction carried on in an inert atmosphere, as outlined above. However, as an added precaution the esterification may be conducted in the dark. It is also advisable to avoid local overheating, and discoloration is minimized if the reaction is conducted below a temperature of about 200° C. To avoid overheating it is advisable to raise the temperature slowly at the beginning, especially if an anhydride be used since the reaction between an anhydride and an alcohol is exothermic.

The preparation of the reactive resins is illustrated in the following examples, the reactants being given in parts by weight.

*Preparation of resin "A"*

| | Parts |
|---|---|
| Fumaric acid (5.5 mols) | 638 |
| Diethylene glycol (5 mols) | 530 |
| Tetrahydroabietyl alcohol (1 mol) | 292 |

Fumaric acid and diethylene glycol are charged into a resin kettle together with 146 parts of alcohol. The resulting mixture is heated for about 4 hours at 180° C., after which the remainder of the alcohol is added and the reacting mixture is heated to about 200° C. and maintained at that point for about 1.5 hours. During the reaction about 175 parts of water are freed and distilled off, and the resin obtained has an acid number of about 49.

*Preparation of resin "B"*

| | Parts |
|---|---|
| Diethylene glycol | 106 |
| Fumaric acid | 116 |
| Linseed oil fatty acids | 73 |

These substances are heated to about 180° C for about 8 hours under an atmosphere of carbon dioxide to obtain a resin having an acid number of about 42.

The resins prepared in the manner illustrated above are merely exemplary of the reactive resins which I contemplate using for reaction with a material containing the $CH_2=C<$ group in the practice of my invention. Other resins of the same type may be prepared in a similar manner. For example, the following reactive resins may be modified with tetrahydroabietyl alcohol: ethylene glycol fumarate, diethylene glycol fumarate, alpha propylene glycol maleate, polyethylene glycol maleates, (e. g. hexaethylene glycol maleate), polymethylene glycol maleates (e. g. decamethylene glycol maleate), octadecandiol fumarate, the maleic esters of 2,2-dimethyl propanediol-1,3, glycerol maleate undecylenate, triethylene, triethylene glycol chlormaleate, triethylene glycol terpene maleate (derived from the interaction of ½ mol of terpene and 1 mol of maleic in the presence of an excess of terpene).

Many different modified alkyd resins may be employed in conjunction with the hydroabietyl alcohol modified resins. Such modified resins include all of those previously mentioned and generically described as modified with a monohydric alcohol or with a monocarboxylic acid or with both a monohydric alcohol and a monocarboxylic acid. Among the alcohols which may be used are n-butanol, 1,2 and 1,3-dichloropropanols $(HO-CH_2-CHCl-CH_2Cl$ and $$CH_2Cl-CHOCH_2Cl)$$

the amyl alcohols, cyclohexanol, n-hexanol, 2-methyl hexanol, n-octanol, decanol, dodecanol, tetradecanol, cetyl alcohol, octadecanol, reduced geraniol, reduced fatty oils such as coconut oil, palm oil, etc., benzyl alcohol, phenylethyl alcohol, furfuryl alcohol, tetrahydrofurfuryl alcohol, and various ether alcohols such as $$CH_2Cl-CHOH-CH_2-O-phenyl$$

$$phenyl-O-CH_2-CHOH-CH_2-O-phenyl,$$

$$CH_2=CH-CH_2-OCH_2-CHOH-$$
$$CH_2-O-CH_2-CH=CH_2$$

the monobutyl ether of ethylene glycol, the monobutyl ether of diethylene glycol etc. Furthermore, various monohydric alcohols may be reacted with glycidol and the reaction products thereof employed as a glycol in the preparation of the unsaturated alkyd resins. Of the cycloaliphatic alcohols, those derived by reaction of dienes with unsaturated aldehydes followed by reduction such as isohexyl cyclohexyl carbinol which is obtained by reducing the reaction product of beta myrcene with acrolein, are especially suitable. Various acids and other compounds having esterifiable hydroxyl groups may be employed in the modification of the unsaturated alkyd resins to be used in accordance with my invention for copolymerization with allyl compounds. Thus, for example, the hydroxy acids may be employed, including lactic acid, alpha-hydroxyisobutyric acid, hydracrylic acid, omega-hydroxycaproic acid, omega-hydroxydecanoic acid, omega-hydroxymyristic acid, etc. Other substances containing hydroxyl groups which may be used are, for example, ethylene cyanohydrin. Still other alcohols which may be employed are terpineol, fanchyl alcohol, and the unsaturated alcohols including allyl alcohol, methallyl alcohol, oleyl alcohol, linoleyl alcohol. I have found that copolymers of alkyd resins modified with monohydric alcohol give especially high temperature resistance when employed as a bond to laminate glass cloth or when glass fibers are used as a filler in castings or moldings.

It is preferable that primary alcohols be used as modifiers for the unsaturated alkyd resins, and it is also preferable that alcohols have boiling points above about 200° C. If low boiling alcohols, e. g. tetrahydrofurfuryl alcohol, be used, it is preferable that the resin be prepared azeotropically as described below.

Since the viscosity of the resin frequently becomes quite high if the esterification is carried to a low acid number, it may be desirable to produce the resin under azeotropic conditions. Accordingly, the esterification is conducted in an organic solvent which dissolves the reactants as well as the resultant resin and which is preferably substantially insoluble in water. Examples of these are: benzene, toluene, xylene, chloroform, carbon tetrachloride, ethylene dichloride, propylene dichloride, ethylene and propylene trichlorides, butylene dichloride and trichloride and also higher boiling solvents such as cresol and methyl cyclohexanone although some of these may tend to darken the resin. The mixture is refluxed in such a manner as to seperate the water formed by the esterification. Much lower temperatures are used than are used under the conditions outlined in the examples. Suitable temperatures range between 90°–145° C., for example, for the boiling members of the group of solvents set forth above. Obviously, this will vary with different solvents and with different concentrations of solvent. The range of preferred concentrations for the inert solvent is from about 25% to about 50%. An esterification catalyst is usually necessary because a comparatively low temperature is employed. Examples of these are thymol sulfonic acid, d-camphor sulfonic acid, napthalene sulfonic acid and p-toluene sulfonic acid. Obviously other known esterification catalysts could be used. A resin having any particular acid number, if made azeotropically, will usually have a lower viscosity than one of the corresponding acid number not made azeotropically.

Monocarboxylic acids which are saturated may be employed as modifiers for the unsaturated monocarboxylic acids heretofore mentioned. Such acids include acetic acid, caproic acid, lauric acid, stearic acid, etc. Any of the monocarboxylic acids which are available in the form of the anhydride may be used as the anhydride instead of as the acid.

When a resin is treated with a reactive material containing the $CH_2=C<$ group, the material may or may not dissolve the resin, depending on the chemical nature of both the material and the resin. If the resin be incompatible with this reactive material, chemical interaction of the type described cannot occur. Under these conditions another solvent may then be introduced as an additional constituent. If the solvent is inert, it plays no part in the reaction but is so selected that both the reactive material and the resin are soluble yielding a homogeneous system of reactive material, inert solvent and resin. This invention relates to compatible combinations of a reactive resin and a reactive material containing the $CH_2=C<$ group. Such combinations may be obtained by the use of inert blending solvents where necessary although the use of only reactive materials containing the $CH_2=C<$ group which act as solvents is preferred.

The terms "compatible" and "homogeneous" as used in the specification and claims are intended to indicate a system, the constituents of which are uniformly distributed throughout the whole mass, and when applied to solutions, to indicate that they may be either true solutions or colloidal solutions as long as they are substantially stable.

When a reactive resin and a reactive material containing the $CH_2=C<$ group undergo chemical reaction, certain possibilities arise. The reactive resin and reactive material may combine in such a manner as to lead to the formation of a resinous colloidal entity, and the end-product is clear, glass-like and homogeneous. Alternatively, the reactive resin and the reactive material may interact in such a manner as to yield colloidal entities wherein varying degrees of opacity or colloidal colors result. The end-product under these conditions may be partially translucent or opaque.

The final resin composition is obtained by dissolving a resin containing the alpha, beta enal

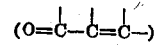

groups in a reactive material containing the group $>C=CH_2$. The chemical reaction which is believed to take place is a combination of the reactive material with the resin at the points of unsaturation, yielding a less unsaturated system which is essentially insoluble and infusible. Ordinarily when a resin is dissolved in a solvent, the changes which occur are physical in nature. The resin may be isolated from the solvent mixture chemically unchanged. In the present invention, however, the combination of the reactive material containing the $CH_2=C<$ group which acts as the solvent and the reactive resin become an inseparable entity, the original ingredients not being capable of being removed by solvents for the original ingredients.

Through the use of a small amount of reactive alkyd resin dissolved in a large amount of reactive material containing the $CH_2=C<$ group, the final composition contains not only the ester groupings which were originally present in the alkyd resin but also the carbon-to-carbon molecular bonds which link the reactive material and the reactive resin. Through the use of a small amount of resin and a large amount of reactive material, the composite resin is no longer soluble in those inert solvents wherein the reactive material resinified alone would dissolve. Under long exposure to the inert solvent the composite resin will tend to imbibe a certain quantity of inert solvent, but it does not possess the solubility of the reactive material when resinified alone. This property is a distinct advantage in that the physical contour of an object made of the polymerized resin is not lost through solution.

Comparison of the softening point of the reactive material containing the $CH_2=C<$ group alone and of the softening point of the composite resin formed through interaction of the resin and reactive material shows that the softening point of the latter has been raised. The softening point may be increased very markedly depending upon the ratio of resin used in the composition.

In general the softening point of resins has a distinct bearing on their behavior at room temperature as well as at elevated temperatures. Where the softening point is too low, difficulty is encountered in that articles made from the resin slowly lose their shape. In large articles, the effect becomes very noticeable. A softening point when too high, on the other hand, results in a composition which will not soften sufficiently in a mold. Roughly, three types of compositions exist with respect to the ratio of resin to reactive material containing the $CH_2=C<$ group. First, a large amount of reactive material and a small amount of resin; second, substantial quantities of both ingredients; third, a large amount of resin and a small amount of reactive material. The second composition when fully cured possesses no softening point. The first and third varieties of composition when cured may, under high temperatures and pressure, be made to flow slightly.

The composition obtained from substantial quantities of both reactive material containing the $CH_2=C<$ group and reactive resin in the cured state may be machined, turned on a lathe, sanded and polished and used in general as a turnery composition. The absence of softening renders the material particularly adaptable to this purpose. In that it is unflowable, it may be machined without danger of softening and gumming tools. Moreover, such a composition may, if desired, be obtained in large blocks.

My resins may be utilized in: moldings, with or without filler; laminated materials as the bonding agent; adhesives; coating compositions for use in finishes for wood, metals or plastics, or in the treatment of fibrous materials such as paper, cloth or leather; as impregnating agents for fibrous materials; as assistants in dyeing, etc.

In order to use the composition for moldings, it may be necessary to prevent the composition from curing too fast. During the change from a liquid to a hard resin, varying stages of hardness exist and by interrupting the reaction at a definite point, the material may then be placed in a form and hardened under heat. Sheets of resin may be twisted or made to conform to a pattern and then subsequently cured in the shaped form by heat alone.

One manner in which this may be accomplished is to polymerize the reactive resin and reactive material containing the $CH_2=C<$ group without catalysts until the material is no longer fluid but still not completely cured. By grinding this partially polymerized material a molding composition is obtained which can then be shaped under heat and pressure.

To produce moldings or laminated materials, combinations of reactive resin and reactive material containing the $CH_2=C<$ group may be mixed with one or more of the various fillers, e. g. wood flour, wood fiber, paper dust, clay, diatomaceous earths, zein, glass wool, mica, granite dust, silk flock, cotton flock, steel wool, silicon carbide, paper, cloth of any fiber including glass, sand, silica flour, white, black or colored pigments, etc. Such mixtures may be partially polymerized, ground and molded. On the other hand, the liquid composition may be bodied and introduced directly into a mold and polymerization from a viscous liquid to a solid resin conducted in one step.

In that the composition of reactive resin and reactive material is initially quite limpid, it may be used for impregnating various porous objects or it may be employed as a coating composition.

If the polymerizable compositions are to be molded under low pressure (e. g. 0–50 pounds/sq. in.), the composition may be employed without bodying or partial polymerization.

The liquid polymerizable mixture may be introduced in a positive mold without any filler. In this instance, however, the reaction becomes quite exothermic but this may be conveniently controlled by the addition of a suitable polymerization inhibitor.

The ratio of reactive material containing the $CH_2=C<$ group to reactive resin in the final composition will not only have a bearing on the softening point and on methods of working the resin, but on various other physical properties, e. g. light transmission, scratch resistance, indentation hardness and arc resistance. By a judicious selection of the ratio of reactive material to reactive resin a composition best suited to these varying needs of industry may be fabricated.

The methods by which the reactive material containing the $CH_2=C<$ group may be made to combine are various. Heat, light or catalysts may be used or combinations of these, or a combination of heat and pressure. Any suitable method of heating may be used including the application of high frequency electric fields to induce heat in the reactive mixture to polymerize the latter.

During the transformation of the soft, limpid resinous composition to a hard massive structure, various stages occur which may be roughly separated as follows: first, the induction period wherein the material remains as a sol which slowly increases in viscosity; secondly, the transformation of the sol into a gel; and third, the hardening of the gel. During the transformation of the sol to a gel, an exothermic reaction occurs which may be very violent if uncontrolled. Moreover, the gel has relatively poor heat conductivity resulting in poor transfer not only of external heat but of the heat that is generated during chemical reaction throughout the mass. Cognizance has to be taken of these features in the hardening of the composition, particularly in the casting or molding of large blocks.

Light, when used alone, causes a relatively long induction period and during the transformation of the sol to the gel requires cooling to overcome the exothermic reactions especially when a powerful source of light is used for final curing. Using heat alone, gelation occurs readily enough at appropriate temperatures but since the gel, when formed, has poor heat conductivity, fracturing may occur in the last stage. Through the use of heat and catalyst, the reaction may become very violent unless the heating is carefully controlled.

Various combinations of these three factors may be used to bring about hardening of the mass. Mild heating of the reactive resin and reactive material containing the $CH_2=C<$ group, with or without inhibitors, brings about a very gradual increase in viscosity which may be controlled quite easily and readily. When the solution has taken on an appropriate consistency, then accelerators may be introduced and heating conducted at a very much lower temperature. Mild heating may first be used and the mass then exposed to light. Use of superoxides and light is very effective. In other words, through the use of initial heating or bodying, the induction time may be decreased markedly.

While I have specifically described the reaction of mixtures of a reactive resin and a reactive material containing the $CH_2=C<$ group in the liquid state, I am not precluded from reacting the reactive material in the vapor state with the resin. Compositions containing a reactive resin and a reactive material containing the $CH_2=C<$ group are originally liquid compositions and by proper treatment at relatively low temperature they can be converted into hard masses. The wide divergence of the properties of such compositions enables them to be used in a variety of different ways. In the liquid form they may be used as an adhesive, impregnating agent, or as a surface coating. In that the hardening does not depend upon evaporation, the liquid may be applied to the surfaces desired with the reactive resin mixed with the reactive material containing the $CH_2=C<$ group, which acts as the solvent and combining in situ to form a homogeneous adhesive. Such an adhesive can be used for bringing diverse substances together, wood, metal, glass, rubber, or other resinous compositions such as phenolic or urea condensation products. As a surface composition in the liquid form, softening agents, cellulose ethers or esters could be added as well as natural or artificial resins, and the hardening brought about with light or through catalysts such as cobalt salts, oxygen liberating substances, etc. Since these compositions dry from the bottom rather than from the top, the latter frequently remains tacky for a relatively lengthy period. In order to overcome this, drying oil fatty acids, e. g. linseed oil fatty acids, are added to the esterification mixture in making the original reactive resin and this will cause the top surface to dry quickly upon subsequent polymerization with a reactive material containing the $CH_2=C<$ group. In this way a coating composition is obtained which dries both from top and bottom.

The liquid resinous composition, moreover, may be cast or molded and after hardening may be isolated as a finished product, or it can be cut, turned and polished into the desired finished product. Provided the surface of the mold is highly polished, the resinous substance acquires a clear, smooth finish from the mold. The compositions so obtained, being insoluble, are not easily attacked by solvents and, being infusible, may be worked with ordinary wood-working or metal tools. The artificial mass can be cut, turned on a lathe, polished and sanded without superficial softening and streaking.

Obviously, natural resins or other synthetic resins may be admixed with the resins of this invention in order to obtain products suitable for particular purposes. Examples of these are shellac, cellulose esters and ethers, urea resins, phenolic resins, alkyd resins, ester gum, etc. The resins of my invention may also be mixed with rubber or synthetic rubber-like products if desired.

Since many of these resins are originally transparent and free of color, they may be colored with suitable dyes to a wide variety of transparent soft pastel shades. An example of a suitable dye is Sudan IV. Darker shades may be obtained if desired, e. g., with nigrosine.

It may be desirable in some instances to form a copolymer of one or more substances containing the group $CH_2=C<$ and at least one polymerizable unsaturated alkyd resin and, after molding or casting this into any desired shape, to apply a coating of a harder copolymer to the outside, thus obtaining the same effect as is obtained in the metallurgical fields by case hardening. Similarly, inserts may be filled with a hard resin in order to act as bearing surfaces or for some other purpose. Such coatings or inserts adhere tenaciously and appear to become integral with the original piece. In order to secure the best results in manufacturing such products, it is desirable to first abrade the surface of the article before the application of the harder film. During the curing operation, the abrasion marks disappear. This treatment is also of considerable importance since it may be used to refinish articles which might have been marred in use.

Many of the advantageous properties of the resin resulting from the polymerization of mixtures containing reactive materials containing the $CH_2=C<$ group and reactive resins are apparent from the foregoing disclosure. Several important advantages are now to be set forth.

In molding and casting operations curing takes place either in the presence or absence of air very rapidly. This is of great importance in curing large blocks. Other alkyd resins require a very much longer time to cure in large blocks, i. e. many months, whereas the composition of a reactive resin and reactive materials containing the $CH_2=C<$ group require only a few days at the most.

Another important advantage is the fact that the reactive material containing the $CH_2=C<$ group which acts as the solvent combines with the resin leaving no residual solvent and giving no problems as to solvent removal.

One of the outstanding advantages of these resins is quick curing time which renders them available for injection molding, blow molding, and extrusion molding.

Similar advantages are present in coating operations such as the lack of shrinkage of the film due to loss of solvent because of the combination between the reactive resin and the reactive material containing the $CH_2=C<$ group which acts as the solvent. Furthermore, the composition dries from the bottom, there are no bubbles from the solvent, and there is no water driven off. A clear, bubble-free, impervious coating is therefore more readily obtainable with the combinations of a reactive resin and reactive material containing the $CH_2=C<$ group than with other coating compositions. Since there is no solvent to be removed and since air is not needed to dry the compositions, relatively thick layers may be applied in one operation.

This application is a continuation-in-part of my copending applications Serial No. 555,194 filed September 21, 1944, and Serial No. 540,142 filed June 13, 1944, now U. S. Patents Nos. 2,443,741 and 2,443,740, respectively.

I claim:

1. A product produced by interpolymerizing a mixture including from 5%–95% of a polymerizable unsaturated alkyd resin chemically modified with tetrahydroabietyl alcohol and from 95%–5% of styrene.

2. A polymerizable composition comprising from 5%–95% of a polymerizable unsaturated alkyd resin chemically modified with tetrahydroabietyl alcohol and from 95%–5% of styrene.

3. A polymerizable composition comprising from 5%–95% of a polymerizable unsaturated alkyd resin chemically modified with tetrahydroabietyl alcohol, from 95%–5% of styrene, and a catalyst for accelerating the copolymerization of said unsaturated alkyd resin with said styrene.

4. A polymerizable composition comprising (1) from 5%–95% of an unsaturated alkyd resin obtained by reaction of ingredients comprising ethylene glycol, fumaric acid and tetrahydroabietyl alcohol, and (2) from 95%–5% of styrene.

5. A molding composition comprising (1) a filler, (2) a polymerizable unsaturated alkyd resin chemically modified with tetrahydroabietyl alcohol, (3) styrene, and (4) a catalyst for accelerating the copolymerization of (2) and (3), (2) and (3) being present in said molding composition in a weight ratio of from 4:1 to 1:4.

6. A shaped article comprising a filler and a copolymer obtained by interpolymerizing a polymerizable composition comprising an unsaturated alkyd resin chemically modified with tetrahydroabietyl alcohol and styrene, said unsaturated alkyd resin and said styrene being present in said polymerizable composition in a weight ratio of from 4:1 to 1:4.

7. A laminated article comprising a plurality of sheets of fibrous material bonded together with an interpolymer of a mixture including a polymerizable unsaturated alkyd resin chemically modified with tetrahydroabietyl alcohol and styrene, said unsaturated alkyd resin and said styrene being present in said mixture in a weight ratio of from 4:1 to 1:4.

EDWARD L. KROPA.

REFERENCES CITED

The following references are of record in the file of this patent:

UNITED STATES PATENTS

| Number | Name | Date |
| --- | --- | --- |
| 2,067,862 | Rummelsberg | Jan. 12, 1937 |
| 2,195,362 | Ellis | Mar. 26, 1940 |
| 2,255,313 | Ellis | Sept. 9, 1941 |
| 2,260,005 | D'Alelio | Oct. 21, 1941 |
| 2,443,740 | Kropa | June 22, 1948 |
| 2,443,741 | Kropa | June 22, 1948 |